US012562554B2

(12) United States Patent
Kanagaraj et al.

(10) Patent No.: US 12,562,554 B2
(45) Date of Patent: Feb. 24, 2026

(54) PARALLEL TRANSFORMER TEMPERATURE MEASUREMENT AND FAULT DETECTION SYSTEM AND METHOD FOR DDC ENCLOSURES

(71) Applicant: Carrier Corporation, Palm Beach Gardens, FL (US)

(72) Inventors: Arun Dev Kanagaraj, Telangana (IN); Alex Raj Arulanandan, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 965 days.

(21) Appl. No.: 17/738,505

(22) Filed: May 6, 2022

(65) Prior Publication Data

US 2022/0360056 A1     Nov. 10, 2022

(30) Foreign Application Priority Data

May 7, 2021    (IN) .............................. 202111020866

(51) Int. Cl.
*H02B 1/56* (2006.01)
*G01K 3/14* (2006.01)
(52) U.S. Cl.
CPC .............. *H02B 1/565* (2013.01); *G01K 3/14* (2013.01)
(58) Field of Classification Search
CPC ................................. H02B 1/565; G01K 3/14
USPC ........................................................ 700/300
See application file for complete search history.

(56) References Cited

U.S. PATENT DOCUMENTS

| | | | | |
|---|---|---|---|---|
| 2008/0170421 A1* | 7/2008 | Kishimoto | .......... | H02M 7/5387 |
| | | | | 363/55 |
| 2009/0211986 A1* | 8/2009 | Kates | ...................... | E04H 4/129 |
| | | | | 210/742 |
| 2015/0109077 A1* | 4/2015 | Tomimbang | ............. | H02H 3/10 |
| | | | | 335/7 |
| 2017/0300046 A1* | 10/2017 | Kerbel | ............... | G05B 23/0235 |
| 2019/0056132 A1* | 2/2019 | Warren | .................... | F24F 11/62 |
| 2021/0083505 A1* | 3/2021 | Beaston | .................. | H02J 3/381 |
| 2022/0044885 A1* | 2/2022 | Andree | .................. | H02H 7/226 |

* cited by examiner

*Primary Examiner* — Md Azad
(74) *Attorney, Agent, or Firm* — CANTOR COLBURN LLP

(57)     ABSTRACT

A system, for measurement of temperatures and detection of faults of parallel transformers in a DDC enclosure, that includes a first transformer and a second transformer arranged in a parallel configuration that deliver power to components of a building management system (BMS). The system also includes a direct digital control (DDC) circuit that controls power delivered through the first and the second transformers to the components of the building management system (BMS). The system further includes a first temperature sensor, operationally connected to the DDC circuit, which measures the temperature of the first transformer. Furthermore, the system includes a second temperature sensor, operationally connected to the DDC circuit, which measures the temperature of the second transformer. The DDC circuit determines a difference between the first temperature and the second temperature to predict a fault in the first transformer or the second transformer.

18 Claims, 2 Drawing Sheets

200

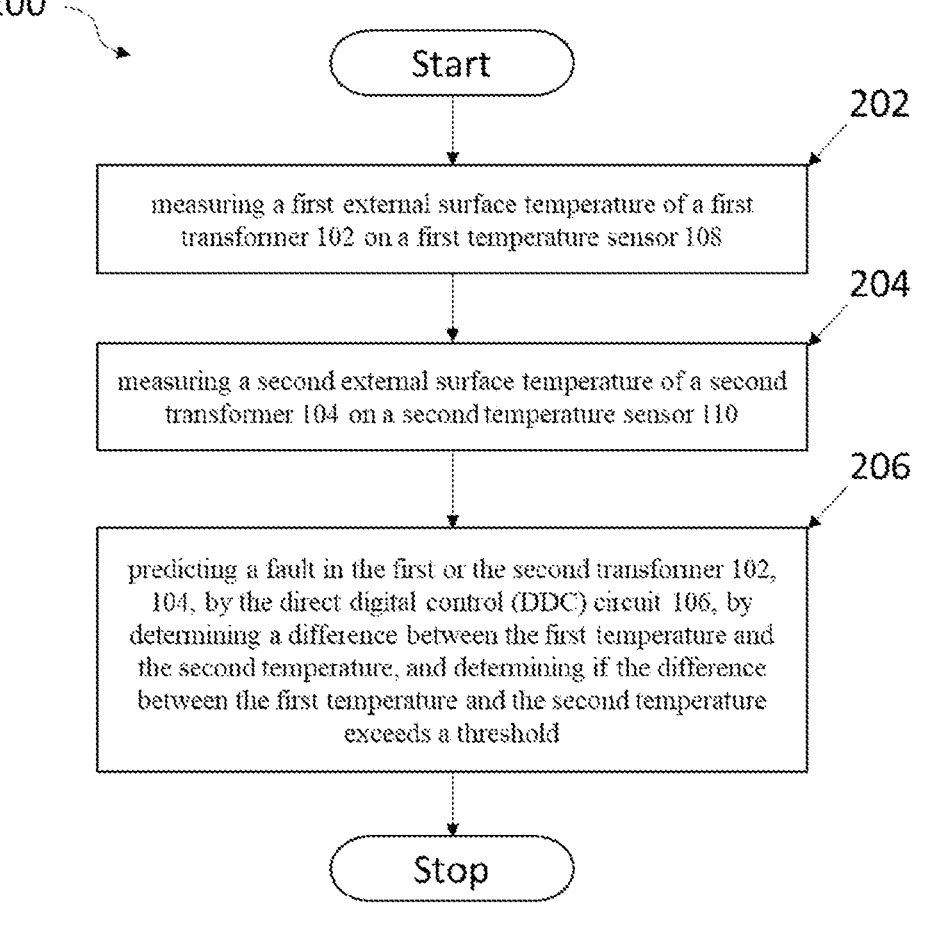

Start

202 measuring a first external surface temperature of a first transformer 102 on a first temperature sensor 108

204 measuring a second external surface temperature of a second transformer 104 on a second temperature sensor 110

206 predicting a fault in the first or the second transformer 102, 104, by the direct digital control (DDC) circuit 106, by determining a difference between the first temperature and the second temperature, and determining if the difference between the first temperature and the second temperature exceeds a threshold Stop

FIGURE 2

PARALLEL TRANSFORMER TEMPERATURE MEASUREMENT AND FAULT DETECTION SYSTEM AND METHOD FOR DDC ENCLOSURES

FOREIGN PRIORITY

This application claims priority to Indian Patent Application No. 202111020866, filed May 7, 2021, and all the benefits accruing therefrom under 35 U.S.C. § 119, the contents of which in its entirety are herein incorporated by reference.

TECHNICAL FIELD OF INVENTION

The present invention generally relates to a building management system (BMS). More particularly, the present invention relates to the power supply circuit of a direct digital control (DDC) panel of a BMS.

BACKGROUND OF THE INVENTION

In several building management systems (BMS), parallel operation of single-phase transformers is widely used. In this parallel operation, two parallel connected transformers, in a Direct Digital Control (DDC) panel, share the load of the BMS field equipment equally. When any one transformer fails during normal operation, then the impact of it falls on the healthy transformer. Since the healthy transformer manages the total load of the DDC Panel, it dissipates more heat inside the enclosure. This leads to eventual tripping of the healthy transformer, when the controls in the DDC panel comes into full operation (peak load) also for a long run hour. This further leads to shutdown of the BMS field control Operation.

In view of the afore-mentioned problems, there is a need of an effective and efficient system and a method for preventing tripping of the healthy transformer and shutdown of the BMS field control operation. There is also a requirement to identify the failure of the faulty transformer in time and to correct the fault. In order to solve the problems in the existing solutions, a system and a method are disclosed.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

Various embodiments of the invention describe a system, that comprises a first transformer and a second transformer arranged in a parallel configuration that deliver power to components of a building management system (BMS). The system also comprises a direct digital control (DDC) circuit that controls power delivered through the first and the second transformers to the components of the building management system (BMS). The system further comprises a first temperature sensor, operationally connected to the DDC circuit, which measures the temperature of the first transformer. Furthermore, the system comprises a second temperature sensor, operationally connected to the DDC circuit, which measures the temperature of the second transformer.

The DDC circuit determines a difference between the first temperature and the second temperature to predict a fault in the first transformer or the second transformer.

In some embodiments of the invention, wherein the system comprises an enclosure for housing the DDC circuit, the first and the second transformers, and the first and second temperature sensors.

In some embodiments of the invention, the enclosure comprises a ventilation fan, and wherein the DDC circuit controls the operation of the ventilation fan based on the first temperature and the second temperature.

In some embodiments of the invention, the DDC circuit predicts the fault if the temperature difference exceeds a predetermined threshold in a period of time.

In some embodiments of the invention, on predicting the fault, the DDC circuit initiates a failure alarm and informs the BMS operators.

In some embodiments of the invention, on predicting the fault, the DDC circuit initiates a Fault Diagnostics and Detection (FDD) BMS Control Algorithm or Control Program.

In some embodiments of the invention, the FDD Control Program, the DDC circuit turns off power to non-essential BMS components to reduce load on the transformers.

In some embodiments of the invention, a BMS operator manually triggers or resets the FDD Control Program.

In some embodiments of the invention, the DDC circuit comprises a manual switch that a BMS operator uses to manually trigger or reset the FDD Control Program.

In some embodiments of the invention, the DDC circuit communicates the fault detection information to a BMS control system.

In some embodiments of the invention, the DDC circuit performs a temporal analysis of the first and second temperatures over a period of time to determine a probability of occurrence of a fault before the fault occurs.

Various embodiments of the invention describe a method, that comprises a step of measuring a first temperature of a first transformer on a first temperature sensor, wherein the first temperature sensor is operationally connected to a direct digital control (DDC) circuit. The method also comprises a step of measuring a second temperature of a second transformer on a second temperature sensor, wherein the second temperature sensor is operationally connected to the direct digital control (DDC) circuit. The first transformer and the second transformer are arranged in a parallel configuration that delivers power to components of a building management system (BMS). The method further comprises a step of predicting a fault in the first or the second transformer, by the direct digital control (DDC) circuit, by determining a difference between the first temperature and the second temperature, wherein the DDC circuit controls power delivered through the first and the second transformers to the components of the BMS.

In some embodiments of the invention, the predicting the fault in the first or the second transformer, is performed by determining if the difference between the first temperature and the second temperature exceeds a threshold.

In some embodiments of the invention, the method comprises, controlling, by the DDC circuit, the operation of ventilation fan based on the first temperature and the second temperature, wherein the DDC circuit, the first and the second transformers, and the first and second temperature sensors are housed in an enclosure, and wherein the enclosure comprises the ventilation fan.

In some embodiments of the invention, the method comprises, initiating a failure alarm and informing the BMS operators, when the DDC circuit predicts that a fault has occurred in any of the first or second transformers.

In some embodiments of the invention, the method comprises, initiating a Fault Diagnostics and Detection (FDD) Control Program by the DDC circuit, when the DDC circuit determines that a fault has occurred in any of the first or second transformers.

In some embodiments of the invention, the method comprises, in the FDD Control Program, turning off power to non-essential BMS components to reduce load on the transformers.

In some embodiments of the invention, the method comprises manual triggering or reset of the FDD Control Program by a BMS operator, wherein the manual triggering or reset of the FDD Control Program by a BMS operator is performed by toggling a manual switch in the DDC circuit.

In some embodiments of the invention, the method comprises communicating a fault detection information by the DDC circuit to a BMS control system.

In some embodiments of the invention, the method comprises performing, by the DDC circuit, a temporal analysis of the first and second temperatures over a period of time to determine a probability of occurrence of a fault before the fault occurs.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Some of the objects of the invention have been set forth above. These and other objects, features, aspects and advantages of the present invention will become better understood with regard to the following description, appended claims and accompanying drawings where:

FIG. 2 is a schematic flow diagram illustrating a method according to an embodiment of the present invention.

Corresponding reference numerals indicate corresponding parts throughout the drawings.

DETAILED DESCRIPTION OF THE INVENTION

Figure 1:
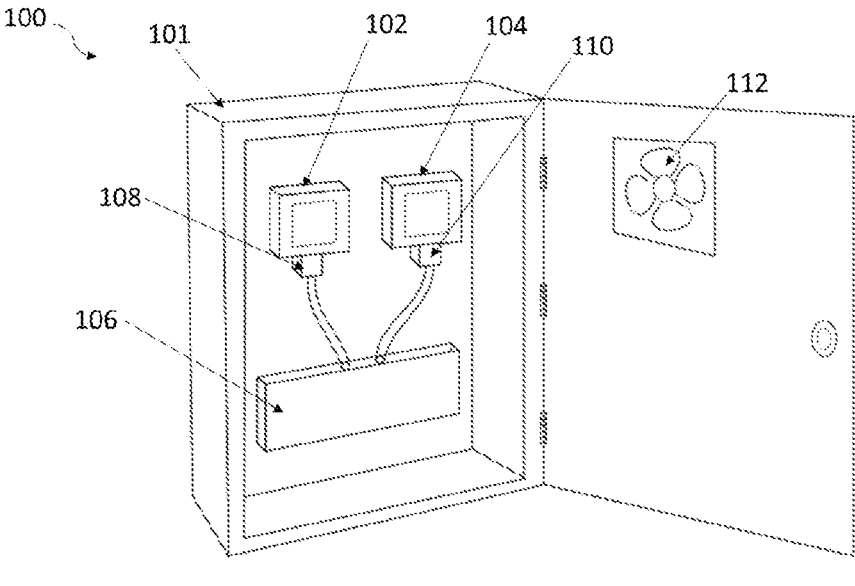
FIG. 1 is a schematic diagram illustrating a system according to an embodiment of the present invention.

The following detailed description should be read with reference to the drawings in which similar elements in different drawings are numbered the same. The drawings, which are not necessarily to scale, depict illustrative embodiments and are not intended to limit the scope of the invention. Although examples of construction, dimensions, and materials are illustrated for the various elements, those skilled in the art will recognize that many of the examples provided have suitable alternatives that may be utilized.

FIG. 1 depicts a system 100 for determining a fault in at least one of a pair of transformers operating in parallel to share the load of a building management system (BMS).

The system 100 comprises a first transformer 102 and a second transformer 104 arranged in a parallel configuration that deliver power to components of a building management system (BMS). The transformers 102, 104 can be any known standard off-the-shelf available transformers used in building management systems. For example, the transformers can be Magnetic Core dry Type Transformer, industrial control transformers, Class 2. Alternatively, the transformers can be custom build to meet the power requirements of a specific BMS.

The system 100 also comprises a direct digital control (DDC) circuit 106 that controls power delivered through the first and the second transformers 102, 104 to the components of the building management system (BMS). The DDC circuit 106 can be any known standard off-the-shelf available DDC circuit 106 used in BMS. Specifically, the DDC circuits are power electronics circuits generally used and interfaced with transformers for controlling power being distributed in the building. Alternatively, the DDC circuit 106 can be custom build using a programmable microcontroller or microcomputer and other known electronic and electrical components to meet the requirements of the BMS. The output from the DDC circuit is coupled to various power loads such as Valve Actuator, Damper Actuator, Field Controllers and I/O Modules, Field Sensors, etc., but not limited to the loads described herein.

Further, the system 100 comprises a first temperature sensor 108, operationally connected to the DDC circuit 106 via a wired or wireless connection, which measures the temperature of the first transformer 102. The system 100 also comprises a second temperature sensor 110, operationally connected to the DDC circuit 106 via a wired or wireless connection, which measures the temperature of the second transformer 104. Alternatively, the temperature measurement can be of any part of the first transformer and the second transformer as per the requirement. The first sensor and the second sensor may be placed accordingly. The first and the second temperature sensors 108, 110 can be any known standard off-the-shelf available temperature sensors. Some examples of off-the-shelf available temperature sensors are: Thermocouples, Resistive Sensors, Infrared Sensors, Bimetallic sensor, change-of-state sensors, etc.

Each of the first and the second temperature sensors 108, 110 are attached to the surface of the respective transformers 102, 104 using any of an adhesive, or tape, or screws, pins, latches, welds, etc. In some instances, the first and the second temperature sensors 108, 110 are attached to the respective transformers 102, 104 using an epoxy adhesive.

In some embodiments of the invention, wherein the system 100 comprises an enclosure 101 for housing the DDC circuit 106, the first and the second transformers 102, 104, and the first and second temperature sensors 108, 110. The enclosure 101 can be any known standard off-the-shelf available enclosure 101 used in BMS. Alternatively, the enclosure 101 can be custom build to meet the Minimum requirement of NEMA Type 4 rating requirements of a specific BMS.

In some embodiments of the invention, the enclosure 101 comprises a ventilation fan 112. The ventilation fan 112 can be mounted on the enclosure 101 at any location. In some instances, the ventilation fan 112 is mounted on a door of the DDC enclosure 101 and is positioned near the transformers 102, 104 to effectively ventilate the heat dissipated by the transformers 102, 104 to the outside of the enclosure 101, i.e., external environment.

In some embodiments, the DDC circuit 106 controls the operation of the ventilation fan 112 based on the first temperature and the second temperatures detected by the first and second temperature sensors 108, 110 respectively.

For example, the speed of the fan 112 can be modulated to speed up or slow down based on the rise or fall, respectively, of the average of the first and second temperatures, thereby, increasing the ventilation and regulating the temperature within the DDC enclosure 101.

In some embodiments, the DDC circuit 106 predicts a fault, when it occurs in any one of the transformers 102, 104. To predict the fault, the DDC circuit 106 determines a difference between the first temperature and the second temperature measured by the first temperature sensor 108 and the second temperature sensor 110 respectively. The DDC circuit 106 predicts that there is a fault in one of the transformers 102, 104, if the temperature difference exceeds a predetermined threshold in a period of time. For example, if the temperature difference exceeds 5° C. for more than 5 mins. Said threshold value and time limit can be dynamically updated in the DDC Circuit based on environmental conditions or requirement of the BMS. For example, in case of a hot summer day, the time limit can be a shorter duration than in case of a cold winter day. As another example, a BMS with heavy loads can have a shorter threshold value of temperature than a BMS with light loads.

In some embodiments of the invention, the DDC circuit 106 performs a temporal analysis of the first and second temperatures over a period of time to determine a probability of occurrence of a fault before the fault occurs. For example, in some embodiments, the DDC circuit 106 measures and correlates the average difference in temperatures of the first and second sensors 108, 110 with respect to the environmental/room temperature, local humidity level, total load on the BMS system, and other variables, such as current, voltage, magnetic field of various components continuously over an extended period of time. For example, when the DDC circuit 106 is in an operational state, it stores the information provided by the sensors on a memory chip or on a remotely connected electronic storage unit (e.g. cloud). The DDC circuit 106 may then use machine learning algorithms to predict when the probability of faults happening in the transformers 102, 104 exceeds a threshold value, for example, when the probability of occurrence of a fault exceeds 50%, and takes preventive measures, such as switching off some of the non-essential components of the BMS to preemptively prevent the faults from happening.

In some embodiments, on predicting a fault or the probability of occurrence of a fault exceeding a threshold value, the DDC circuit 106 initiates a failure alarm and informs the BMS operators. In some instances, the failure alarm can be a sound alarm or a flashing light positioned on the DDC enclosure 101. In some other embodiments, the DDC circuit 106 can transmit a text message or voice message or digital error code to a remotely connected computer, mobile device, wearable device of the BMS operator, etc.

In some embodiments, on predicting the fault or the probability of occurrence of a fault exceeding threshold, the DDC circuit 106 initiates a Fault Diagnostics and Detection (FDD) Control Program. In the FDD Control Program, the DDC circuit 106 shuts down non-essential BMS equipment and manage the available power by operating only essential equipment connected to the DDC circuit 106 to reduce load on the transformers 102, 104. In some embodiments, the FDD control program sends an alert to a BMS operator (person) on a workstation, hand-held, or wearable device associated with the BMS operator.

In some embodiments, the BMS operator rectifies the fault in the transformers 102, 104 upon receiving the alert.

In some embodiments, the BMS operator may replace a faulty transformer 102, 104 with a new one to rectify the fault.

In some embodiments, upon rectification of the fault, the BMS operator manually triggers or resets the FDD Control Program or during maintenance operations. In some embodiments, the DDC circuit 106 comprises a manual switch (not shown) that a BMS operator uses to manually trigger or reset the FDD Control Program to return the DDC circuit to normal operation. In some other embodiments, the workstation or hand-held, or wearable device associated with the BMS operator comprises a software switch that the operator can trigger or reset to return the DDC circuit 106 to normal operation.

In some embodiments of the invention, the DDC circuit 106 communicates the fault detection information to a BMS control system. The BMS control system can be a remote server or computer connected to the DDC circuit 106 via wired or wireless connection. In some embodiments, the BMS control system can communicate with several such DDC circuits 106 of several BMS systems respectively. In some embodiments, the BMS control system can write or update or change the FDD control program on one or more DDC circuits 106.

FIG. 2 illustrates a schematic flow diagram representing a method 200 of operation of the system 100. The method is performed by the DDC circuit 106, the method comprises a step 202 of measuring a first temperature of the first transformer 102 on the first temperature sensor 108. The method also comprises a step 204 of measuring a second temperature of a second transformer 104 on a second temperature sensor 110. The method further comprises a step 206 of predicting a fault in the first or the second transformer 102, 104 by determining a difference between the first temperature and the second temperature. In some embodiments, the predicting the fault in the first or the second transformer 102, 104, is performed by determining if the difference between the first temperature and the second temperature exceeds a threshold.

In some embodiments, the method comprises, a step (not shown) of controlling the operation of a ventilation fan 112 based on the first temperature and the second temperature.

In some embodiments, the method comprises, a step (not shown) of initiating a failure alarm and informing the BMS operators, when the DDC circuit 106 predicts that a fault has occurred in any of the first or second transformers 102, 104.

In some embodiments, the method comprises, a step (not shown) of initiating a Fault Diagnostics and Detection (FDD) Control Program, when the DDC circuit 106 predicts that a fault has occurred in any of the first or second transformers 102, 104.

In some embodiments, the method comprises, a step (not shown) of initiating the FDD Control Program, turning off power to non-essential BMS components to reduce load on the transformers 102, 104.

In some embodiments, the method comprises a step (not shown) of manual triggering or reset of the FDD Control Program by a BMS operator, wherein the manual triggering or reset of the FDD Control Program by a BMS operator is performed by toggling a manual switch in the DDC circuit 106.

In some embodiments, the method comprises a step (not shown) of communicating a fault detection information to a BMS control system.

In some embodiments of the invention, the method comprises a step of performing a temporal analysis of the first and second temperatures over a period of time to determine a probability of occurrence of a fault before the fault occurs and taking preemptive measures to prevent the fault from occurring.

The present invention is applicable to various fields such as, but not limited to, parallel transformers connected to direct digital control circuits of building management systems, industrial plants and any such application that is well known in the art.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

The embodiments of the invention discussed herein are exemplary and various modification and alterations to a person skilled in the art are within the scope of the invention.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
a first transformer and a second transformer arranged in a parallel configuration that deliver power to components of a building management system (BMS);
a direct digital control (DDC) circuit that controls power delivered through the first and the second transformers to the components of the BMS;
a first temperature sensor, operationally connected to the DDC circuit, which measures the temperature of the first transformer; and
a second temperature sensor, operationally connected to the DDC circuit, which measures the temperature of the second transformer,
wherein the DDC circuit determines a difference between the first temperature and the second temperature to predict a fault in the first transformer or the second transformer;

wherein on predicting the fault, the DDC circuit initiates a failure alarm and informs the BMS operators.

2. The system of claim 1, wherein DDC circuit predicts the fault if the temperature difference exceeds a predetermined threshold in a period of time.

3. The system of claim 1, wherein the system comprises an enclosure for housing the DDC circuit, the first and the second transformers, and the first and second temperature sensors.

4. The system of claim 1, wherein the enclosure comprises a ventilation fan, and wherein the DDC circuit controls the operation of the ventilation fan based on the first temperature and the second temperature.

5. The system of claim 2, wherein on predicting the fault, the DDC circuit initiates a Fault Diagnostics and Detection (FDD) Control Program protocol.

6. The system of claim 5, wherein in the FDD Control Program, the DDC circuit turns off power to non-essential BMS components to reduce load on the transformers.

7. The system of claim 5, wherein a BMS operator manually triggers or resets the FDD Control Program.

8. The system of claim 7, wherein the DDC circuit comprises a manual switch that a BMS operator uses to manually trigger or reset the FDD Control Program.

9. The system of claim 1, wherein the DDC circuit communicates the fault detection information to a BMS control system.

10. The system of claim 1, wherein the DDC circuit performs a temporal analysis of the first and second temperatures over a period of time to determine a probability of occurrence of a fault before the fault occurs.

11. A method comprising:
measuring a first temperature of a first transformer on a first temperature sensor, wherein the first temperature sensor is operationally connected to a direct digital control (DDC) circuit;
measuring a second temperature of a second transformer on a second temperature sensor, wherein the second temperature sensor is operationally connected to the direct digital control (DDC) circuit, wherein the first transformer and the second transformer are arranged in a parallel configuration that delivers power to components of a building management system (BMS);
predicting a fault in the first or the second transformer, by the direct digital control (DDC) circuit, by determining a difference between the first temperature and the second temperature, wherein the DDC circuit controls power delivered through the first and the second transformers to the components of the BMS;
wherein the method comprises, initiating a failure alarm and informing the BMS operators, when the DDC circuit predicts that a fault has occurred in any of the first or second transformers.

12. The method of claim 11, wherein the predicting the fault in the first or the second transformer, is performed by determining if the difference between the first temperature and the second temperature exceeds a threshold.

13. The method of claim 11, wherein the method comprises, controlling, by the DDC circuit, the operation of a ventilation fan based on the first temperature and the second temperature, wherein the DDC circuit, the first and the second transformers, and the first and second temperature sensors are housed in an enclosure, and wherein the enclosure comprises the ventilation fan.

14. The method of claim 11, wherein the method comprises, initiating a Fault Diagnostics and Detection (FDD) Control Program Control Program by the DDC circuit, when the DDC circuit determines that a fault has occurred in any of the first or second transformers.

15. The method of claim 14, wherein the method comprises, in the FDD Control Program, turning off power to non-essential BMS components to reduce load on the transformers.

16. The method of claim 11, wherein the method comprises manual triggering or reset of the FDD Control Program by a BMS operator, wherein the manual triggering or reset of the FDD Control Program by a BMS operator is performed by toggling a manual switch in the DDC circuit.

17. The method of claim 11, wherein the method comprises communicating a fault detection information by the DDC circuit to a BMS control system.

18. The method of claim 11, wherein the method comprises performing, by the DDC circuit, a temporal analysis of the first and second temperatures over a period of time to determine a probability of occurrence of a fault before the fault occurs.

* * * * *